（12） United States Patent
Eid et al.

(10) Patent No.: US 11,311,843 B2
(45) Date of Patent: Apr. 26, 2022

(54) PRECISE FABRICATION OF ACTIVATED-HYDROPHILIC-HYDROPHOBIC MXENES-BASED MULTIDIMENSIONAL NANOSYSTEMS FOR EFFICIENT AND PROMPT WATER PURIFICATION FROM PETROLEUM WASTES AND DESALINATION PROCESS UNDER AMBIENT CONDITIONS

(71) Applicant: QATAR UNIVERSITY, Doha (QA)

(72) Inventors: Kamel Abdelmoniem Mohamed Eid, Sharkia (EG); Ahmed Mohamed Shehata Soliman, Alexandria (EG); Ahmed Abdelfattah Ahmed Mohamed Elzatahry, Nabeel-Altwabik-Faisal (EG); Aboubakr Moustafa Abdullah, Giza (EG)

(73) Assignee: QATAR UNIVERSITY, Doha (QA)

( * ) Notice: Subject to any disclaimer, the term of this patent is extended or adjusted under 35 U.S.C. 154(b) by 0 days.

(21) Appl. No.: 16/840,283

(22) Filed: Apr. 3, 2020

(65) Prior Publication Data

US 2020/0254396 A1    Aug. 13, 2020

(51) Int. Cl.
*B01D 69/12* (2006.01)
*B01D 71/08* (2006.01)
*B01D 67/00* (2006.01)
*C02F 1/42* (2006.01)
*C02F 101/12* (2006.01)
*C02F 101/32* (2006.01)

(52) U.S. Cl.
CPC ......... *B01D 69/12* (2013.01); *B01D 67/0093* (2013.01); *B01D 71/08* (2013.01); *C02F 1/42* (2013.01); *B01D 2325/02* (2013.01); *B01D 2325/26* (2013.01); *B01D 2325/36* (2013.01); *C02F 2101/12* (2013.01); *C02F 2101/327* (2013.01)

(58) Field of Classification Search
CPC .... B01D 69/12; B01D 71/08; B01D 67/0093; B01D 67/0079; B01D 69/148; B01D 71/02; C02F 1/42; C02F 1/288
See application file for complete search history.

(56) References Cited

U.S. PATENT DOCUMENTS

2018/0169591 A1    6/2018 Mahmoud et al.
2019/0344222 A1*   11/2019 Han ................... B01D 71/027

FOREIGN PATENT DOCUMENTS

CN    107029562 A    8/2017
CN    107694510 A    2/2018
(Continued)

OTHER PUBLICATIONS

"Ultrathin Two-dimensional MXene Membrane for Pervaporation Desalination", Guozhen Liu, et al, J. Membrane Science, 548 (2018).*

(Continued)

*Primary Examiner* — Krishnan S Menon
(74) *Attorney, Agent, or Firm* — Squire Patton Boggs (US) LLP

(57) ABSTRACT

Provided herein are compounds, compositions, and methods for the treatment of wastewater. Provided herein are compounds, composites, compositions, and methods for purifying a medium such as wastewater, saline for desalination, and petroleum wastes.

25 Claims, 8 Drawing Sheets

(56) References Cited

FOREIGN PATENT DOCUMENTS

| CN | 108273469 A | 7/2018 |
|---|---|---|
| CN | 109052548 A | 12/2018 |
| CN | 109437202 A | 3/2019 |

OTHER PUBLICATIONS

Michael Naguib et al., "Ti3C2Tx (MXene)-Polyacrylamide Nanocomposite Films," RSC Advances, 2016, 00, pp. 1-5, www.rsc.org/advances.

Runlin Han et al., "Preparation of a new 2D MXene/PES Composite Membrane with Excellent Hydrophilicity and High Flux", RSC Advances, 2017, 7, pp. 56204-56210, The Royal Society of Chemistry.

Zhi Xu et al., "Two Dimensional MXene Incorporated Chitosan Mixed-matrix Membranes for Efficient Solvent Dehydration," Journal of Membrane Science, vol. 563, Oct. 1, 2018, pp. 625-632.

M. Abdullah Iqbal et al., "Improved Organic Dye Degradation Using Highly Efficient MXene Composites," Preprints, Posted: Nov. 16, 2018, https://www.researchgate.net/publication/329037674.

Lina Wang et al., "Hydroxide Conduction Enhancement of Chitosan membranes by Functionalized MXene," Materials 2018, 11, 2335, doi:10.3390/ma11112335, 11 pages, www.mdpi.com/journal/materials.

* cited by examiner

Quantification Report

/ C= / data / Soliman17-06-2019. dset Sun Oct 6 17:19:14 2019 state : Angle Name : max phase

| Peak | Type | Position BE (eV) | F??? (eV) | Raw Area (cps eV) | RSF | Atomic Mass | Atomic Conc % | Mass Conc % |
|---|---|---|---|---|---|---|---|---|
| C 1s | Reg | 281.000 | 4.814 | 156070.0 | 0.278 | 12.011 | 29.63 | 17.72 |
| O 1s | Reg | 527.000 | 4.542 | 688324.0 | 0.780 | 15.999 | 45.97 | 36.62 |
| N 1s | Reg | 395.000 | 4.987 | 7936.0 | 0.477 | 14.007 | 0.82 | 0.57 |
| Ti 2g | Reg | 454.000 | 7.097 | 504107.0 | 2.001 | 47.878 | 12.89 | 30.72 |
| Al 2g | Reg | 70.000 | 3.874 | 41646.0 | 0.193 | 26.982 | 10.69 | 14.36 |
| F 1s | Reg | 681.000 | 1.161 | 0.0 | 1.000 | 18.998 | 0.00 | 0.00 | state : Angle Name : after etching

| Peak | Type | Position BE (eV) | F??? (eV) | Raw Area (cps eV) | RSF | Atomic %ass | Atomic Conc % | Mass Conc % |
|---|---|---|---|---|---|---|---|---|
| C 1s | Reg | 284.000 | 5.682 | 257354.0 | 0.278 | 12.011 | 38.16 | 20.71 |
| O 1s | Reg | 530.000 | 4.153 | 476206.0 | 0.780 | 15.999 | 24.78 | 17.92 |
| N 1s | Reg | 1201.000 | 1.000 | 0.0 | 0.477 | 14.007 | 0.00 | 0.00 |
| Ti 2g | Reg | 456.000 | 9.207 | 1111177.0 | 2.001 | 47.878 | 22.17 | 47.97 |
| Al 2g | Reg | 76.000 | 3.594 | 8576.0 | 0.193 | 26.982 | 1.72 | 2.09 |
| F 1s | Reg | 685.000 | 3.508 | 317107.0 | 1.000 | 18.998 | 13.17 | 11.31 |

FIG. 3B

PRECISE FABRICATION OF ACTIVATED-HYDROPHILIC-HYDROPHOBIC MXENES-BASED MULTIDIMENSIONAL NANOSYSTEMS FOR EFFICIENT AND PROMPT WATER PURIFICATION FROM PETROLEUM WASTES AND DESALINATION PROCESS UNDER AMBIENT CONDITIONS

TECHNICAL FIELD

Provided herein are compounds, composites, compositions, and methods for purifying a medium comprising a pollutant (e.g., media such as wastewater, saline for desalination, and petroleum wastes).

BACKGROUND ART

Several technologies are currently in use for water purification or treatment, such as physical adsorption, photocatalytic degradation, chemical oxidation, membrane filtration, and electrochemical treatments. These strategies rely on multiple complicated steps, special laboratory equipment or techniques, specific parameters (e.g., heating, pressure, electricity), and prolonged treatment times.

New, simple, and efficient compositions, systems, or composites for the removal of pollutants from, e.g., wastewater streams or petroleum wastes may circumvent the current limitations on the removal of pollutants.

BRIEF SUMMARY

Provided herein are compounds, composites, compositions, and methods useful for wastewater and/or desalination treatments.

In certain aspects and embodiments, provided herein is a composite membrane comprising
chitosan; and
an activated compound having the following formula $$M_{(n+1)}X_nT_x$$

wherein
each M is independently an early transition metal from Group 4 to Group 12 in the periodic table (e.g., Ti, V, Cr, Nb, and the like, either as a single element or in combination)
each X is independently carbon or nitrogen;
each T is independently O, F, OH, COOH, S, or Cl (e.g., O, OH, or F, either as a single component or in combination), wherein at least one T is O or OH; and
n and x are each an integer independently selected from the group consisting of 1, 2, and 3;
wherein the activated compound is embedded in the chitosan.

In certain aspects and embodiments, the activated compound is $Ti_3C_2T_x$.

In certain aspects and embodiments, provided herein is a composite membrane comprising
chitosan and
a plurality of nanoscale particles comprising an activated compound of formula $$Ti_3C_2T_x$$

wherein
each T is an independently selected O, F, OH, COOH, S, or Cl (e.g., either as a single component or in combination), wherein at least one T is O or OH; and
x is an integer selected from the group consisting of 1, 2, and 3;
wherein the plurality of nanoscale particles is arranged in one or more two-dimensional nanosheets; and wherein the nanosheets are embedded in a three-dimensional chitosan structure.

In certain aspects and embodiments, provided is a method for purifying a medium comprising treating the medium with a composite membrane as otherwise described herein; and adsorbing pollutants from the medium.

In certain aspects and embodiments, provided herein is a method for desalinating water comprising treating saline with the composite membrane as otherwise described herein; and adsorbing saline pollutants from the saline (e.g., thereby providing a less concentrated saline or water).

BRIEF DESCRIPTIONS OF THE DRAWING

FIGS. 3A-3B show (A) X-ray photoelectron spectroscopy (XPS) of $Ti_3AlC_2$ and $Ti_3C_2T_x$ MXene multidimensional membranes, and (B) detailed compositions of each of the elements.

DETAILED DESCRIPTION

Figure 1A:
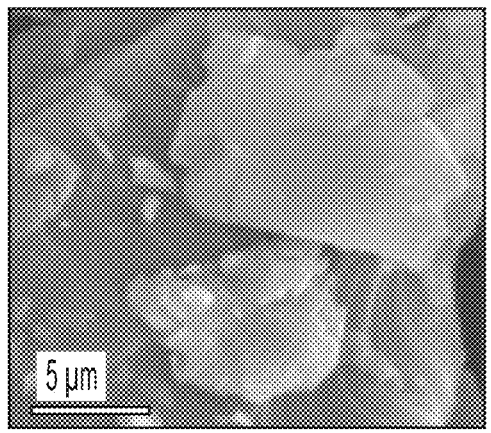
FIGS. 1A-1F show scanning electron microscope (SEM) images of (A) $Ti_3AlC_2$, (B) $Ti_3C_2T_x$ before delamination, (C) $Ti_3C_2T_x$ after delamination, (D) activated $Ti_3C_2T_x$, and (E) multidimensional membrane at 10 μm magnification and (F) multidimensional membrane at 2 μm magnification.
Figure 1B:
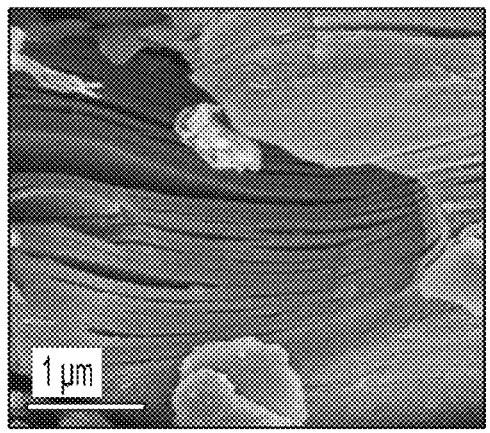
Figure 1C:
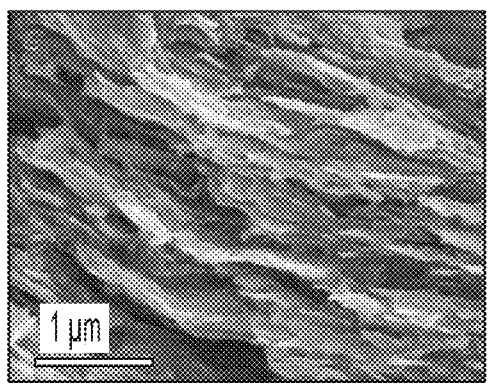
Figure 1D:
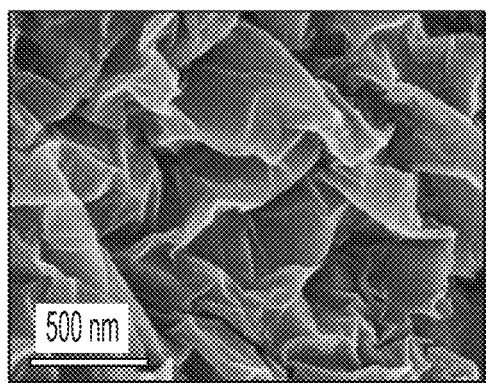
Figure 1E:
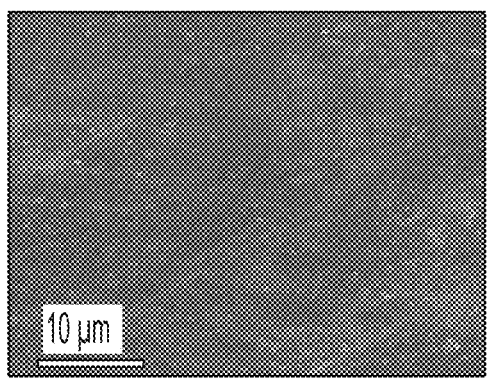
Figure 1F:
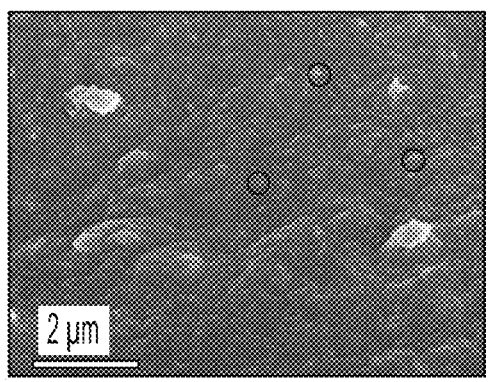

Provided herein are compounds, composites, compositions, and methods useful for wastewater and/or desalination treatments.

Definitions

When referring to the compounds, composites, compositions, and methods provided herein, the following terms and phrases have the following meanings unless indicated otherwise. Unless defined otherwise, all technical and scientific terms and phrases used herein have the same meaning as is commonly understood by one of ordinary skill in the art. In the event that there is a plurality of definitions for a term or phrase provided herein, these Definitions prevail unless stated otherwise.

As used herein, "a," "an," or "the" can include not only includes aspects and embodiments with one member, but also aspects and embodiments with more than one member. For example, an aspect comprising "a metal selected from the group consisting of X, Y, and Z" may present embodiments comprising X, Y, Z, X in combination with Y, Y in combination with Z, X in combination with Z, or all three (X, Y, and Z) in combination.

As used herein, "activation" or "activated" refers to treatment of a chemical substance to improve the chemical properties of the chemical substance compared to the chemical properties of the chemical substance before such treatment. For example, an activated chemical substance has chemical properties that are better and/or more useful than the corresponding chemical substance or educt in unactivated form.

As used herein, "embedded" refers to the incorporation of a first material within a second material.

As used herein, "nanoscale" refers to particles having a size of less than 100 nm.

As used herein, "nanosheets" refers to nanoscale particles arranged in the form of sheets or layers of the nanoscale particles.

As used herein, "flexible" refers to the ability of a material to withstand an applied external force. For example, a material is flexible when after the applied external force is removed, the material returns to its original state.

As used herein, "hydrogel" refers to cross-linked hydrophilic polymers that maintain structural integrity when dispersed in water.

As used herein, "independently" refers to the relationship among multiple instances of the same variable when selected from the same set of possibilities (e.g., a Markush group). For example, if the variable X is selected independently from the group consisting of a, b, and c, each instance of X in a structure can be the same as (e.g., all "a") or be different from any other instance of X (e.g., for three "X," one "b" and two "a" or any other combination of a, b, and c).

Typically, for at least some embodiments of a group as disclosed herein (e.g., "A, B, or C"; "the member selected from the group consisting of A, B, and C"), members of the group are (1) independently selected from the alternatives and (2) groups do not exclude the possibility of embodiments comprising combinations of the individual group members.

As used herein, "or" is not exclusive (i.e., "or" may be equivalent to "and/or"). For example, an aspect comprising "A, B, or C" may present embodiments with A, B, C, A in combination with B, B in combination with C, A in combination with C, or all three (A, B, and C) in combination.

As used herein, "portable" refers to use on a scale less than an industrial scale (e.g., metric tons). For example, portable refers to use on a domestic scale (e.g., lbs).

As used herein, "halogen" refers to fluorine (F), chlorine (Cl), bromine (Br), or iodine (I).

As used herein, "industrial wastewater" refers to water waste derived from industrial scale (e.g., metric ton) oil, gas, and petroleum processing.

As used herein, "domestic wastewater" refers to water waste derived from, for example, household use.

As used herein, "microbes" refers to any microorganism causing disease. For example, microbes include, without limitation, bacterium.

As used herein, "heavy metals" refers to any metallic chemical element that has a relatively high density and is toxic or poisonous at low concentrations. Examples of heavy metals include, without limitation, mercury (Hg), cadmium (Cd), arsenic (As), chromium (Cr), thallium (Tl), and lead (Pb).

As used herein, "petroleum waste products" refers to crude oil and unrefined petroleum.

As used herein, "industrial-scale saline" refers to a water medium comprising 15000-35000 ppm of NaCl.

As used herein, "domestic saline" refers to a water medium comprising 1000-10000 ppm of NaCl.

As used herein, "saline pollutants" refers to 1000-35000 ppm of NaCl.

As used herein "zero-dimensional" nanomaterials (e.g., nanoparticles) refer to nanomaterials where all the dimensions of the nanomaterials are measured within the nanoscale. For example, in certain embodiments, no dimension of the nanomaterial is larger than 100 nm. In certain embodiments, zero-dimensional nanomaterials are nanoparticles.

As used herein "one-dimensional" nanomaterials (e.g., nanosheets) refer to nanomaterials where at least one dimension is outside of the nanoscale. For example, in certain embodiments, when one dimension of the nanomaterial is larger than 100 nm. In certain embodiments, one-dimensional nanomaterials are nanosheets.

As used herein "two-dimensional" nanomaterials (e.g., nanosheets) refer to nanomaterials where at least two dimensions are outside the nanoscale. For example, in certain embodiments, when two dimensions of the nanomaterial are larger than 100 nm. In certain embodiments, two-dimensional nanomaterials are plate-like shapes. In certain embodiments, two-dimensional nanomaterials include, without limitation, nanofilms, nanolayers, and nanocoatings.

As used herein, "three-dimensional" materials refer to materials where each dimension is outside the nanoscale. For example, in certain embodiments, three-dimensional materials include, without limitation, chitosan.

As used herein, "process water" refers to water used in industrial processes. For example, in certain embodiments, process water is water used in industrial processes that require heating. By way a further example, in certain embodiments, process water is water used in industrial processes related to aluminum production. By way of further example, in certain embodiments, process water is water used in industrial processes involving oil processing. By way of further example, in certain embodiments, process water is water used in industrial processes involving gas processing.

As used herein, "produced water" refers to water produced as a byproduct during the extraction of oil and natural gas.

As used herein, "water contact angle" refers to the angle where a liquid-vapor interface meets a solid interface. The water contact angle exists as an equilibrium that reflects the relative strengths of the interactions between liquids, vapors, and solids. Generally a water contact angle that is less than 90° corresponds to a solid surface that is hydrophilic. Conversely, in general, a water contact angle that is greater than 90° corresponds to a solid surface that is hydrophobic.

Compounds—MXenes and Chitosans

In certain aspects, provided herein are compounds. Without being bound by any particular theory of operation, the compounds include inorganic compounds embedded within organic compounds where the combination improves the structure of the organic compound network.

In certain embodiments, the combination of the inorganic compound within the organic compound is useful for water treatment(s). In certain embodiments, the combination of the inorganic compound within the organic compound improves the physical characteristics of the organic compound. In certain embodiments, the combination of the inorganic compound with the organic compound improves the chemical characteristics of the organic compound. In certain embodiments, combinations of improved physical and/or chemical properties of the combination of the inorganic compound with the organic compound allows for improved efficiency for water treatment(s). In certain embodiments, the combination of the inorganic compound within the organic compound is capable of carrying out any activity related to water treatment(s). Certain combinations of the inorganic compound within the organic compound can have one or more additional activities. In certain embodiments, the combinations of the inorganic compound within the organic compound is capable of modulating the efficacy of water treatment(s).

In some aspects and embodiments, provided herein is a composite membrane comprising chitosan and
a plurality of nanoscale particles comprising an activated compound of formula $$Ti_3C_2T_x$$

wherein
each T is an independently selected O, F, OH, COOH, S, or Cl, wherein at least one T is O or OH; and
x is an integer selected from the group consisting of 1, 2, and 3;
wherein the plurality of nanoscale particles is arranged in one or more two-dimensional nanosheets; and wherein the nanosheets are embedded in a three-dimensional chitosan structure.

In certain aspects, provided herein is a free-standing composite membrane comprising chitosan and an activated compound of formula $$M_{(n+1)}X_nT_x$$

wherein
each M is an independently selected early transition metal from Group 4 to Group 12;
each X is an independently selected carbon or nitrogen;
each T is an independently selected O, F, OH, COOH, S, or Cl, wherein at least one T is O or OH; and
n and x are each an integer independently selected from the group consisting of 1, 2, and 3;
wherein the activated compound is embedded in the chitosan.

In certain embodiments, M is Ti, V, Cr, or Nb. In certain embodiments, M is Ti.

In certain embodiments, T is hydroxide, oxygen, or fluoride. In certain embodiments, T is oxygen or fluoride. In certain embodiments, T is oxygen. In certain embodiments, T is hydroxide or fluoride. In certain embodiments, the composite membrane comprises nanoparticles (or a plurality of nanoscale particles) comprising the activated compound. In certain embodiments, at least some of the nanoparticles comprise the activated compound. In certain embodiments, the plurality of nanoscale particles is arranged in one or more nanosheets. In certain embodiments, the nanoparticles are arranged in one or more zero-dimensional, one-dimensional, two-dimensional, or three-dimensional nanosheets. In certain embodiments, the nanosheets are zero-dimensional, one-dimensional, or two-dimensional (e.g., two-dimensional). In certain embodiments, the nanosheets are embedded in a zero-dimensional, a one-dimensional, or a three-dimensional chitosan structure. In certain embodiments, the nanosheets are embedded in a three-dimensional chitosan structure.

In certain embodiments, the nanosheets are flexible or rigid. In certain embodiments, the composite membrane is flexible.

In certain embodiments, the chitosan is a hydrogel.

In certain embodiments, the nanosheets are characterized by an electrical conductivity from $0.2 \times 10^{-2}$ S·cm$^{-1}$ to $10 \times 10^{-2}$ S·cm$^{-1}$ (e.g., 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.2, 2.5, 2.8, 3.0, 3.2, 3.5, 3.8, 4.0, 4.2. 4.5, 4.8, 5.0, 5.5, 6.0, 6.5, 7.0, 7.5, 8.0, 8.5, 9.0, 9.5, or 10 $10 \times 10^{-2}$ S·cm$^{-1}$)

In certain embodiments, T is OH, COOH, F, or S, and the composite membrane is chemically and physically stable up to 180° C. (e.g., as measured by FTIR and TGA analysis).

In certain embodiments, the nanosheets are characterized by a surface hydrophilicity from about 5° to 60° (e.g., as measured by water contact angle; e.g., about 5, 10, 15, 20, 25, 30, 35, 40, 45, 50, 55, or 60°).

In certain embodiments, the nanosheets are characterized by a surface hydrophobicity of more than 90° (e.g., as measured by water contact angle).

In certain embodiments, the nanosheets have a surface area:volume ratio from about 10 to 400 m$^{2-}$g$^{-1}$ (e.g., about 10, 20, 30, 40, 50, 60, 75, 100, 125, 150, 175, 200, 225, 250, 275, 300, 325, 350, 375, or 400 m$^{2-}$g$^{-1}$).

In certain embodiments, the nanosheets have an adsorption from about 200 to 4000 cm$^3$g$^{-1}$ (e.g., as measured by nitrogen adsorption/desorption isotherms) (e.g., about 200, 250, 300, 350, 400, 450, 500, 600, 700, 800, 900, 1000, 1250, 1500, 1750, 2000, 2250, 2500, 2750, 3000, 3250, 3500, 3750, or 4000 cm$^3$g$^{-1}$).

In certain embodiments, the nanosheets have an intercalation loading or capacity of about 70-100% within 20 min (e.g., as measured by Perkin Elmer Clams 680-GC-FID with TurboMatrix Headspace) (e.g., about 70, 75, 80, 85, 90, 95, 96, 97, 98, 99, or 100%).

In certain embodiments, the nanosheets are characterized by an antimicrobial effect of about 20-100% against bacteria (e.g., as measured by a micro-plate reader) (e.g., about 20, 30, 40, 50, 60, 70, 80, 90, 95, or 100%).

In certain embodiments, the bacteria is gram negative. In certain embodiments, the the bacteria is gram positive. In certain embodiments, the bacteria is fecal coliform bacteria. In certain embodiments, the bacteria is selected from the group consisting of *Escherichia coli, salmonella enterica*, and *staphylococcus*.

In certain embodiments, the composite membrane is portable.

In certain embodiments, the activated compound loading is about 10-50% of chitosan (ww) (e.g., about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50% w/w).

In certain embodiments, when the activated compound loading is 10-50% of chitosan, the composite membrane is characterized by a swelling of about 20-200% (e.g., as measured by a Tea bag test) (e.g., about 20, 25, 30, 35, 40, 45, 50, 60, 70, 80, 90, 100, 110, 120, 130, 140, 150, 160, 170, 180, 190, or 200%).

The typical tea-bag protocol included weighing and placing the initial membrane (i.e., $W_0$) into a tea bag (acrylic/polyester gauze with fine meshes). The bag was then dipped in water solution for 20 min, followed by removing the bag from water and placing it on a dry filter to remove the unadsorbed water. The tea bag is weighed again (i.e., $W_1$). The empty bag is also dipped in water and then weighed for comparison (i.e., $W_2$). The swelling capacity ($S_t$) was calculated using the following equation:

$$S_t=[(W_2-W_1-W_0)/(W_0)]X\%$$

In certain embodiments, the chitosan has a low molecular weight of about 50,000-190,000 Da, a medium molecular weight of about 190,000-310,000 Da, or a high molecular weight of about 310000-375000 Da.

In certain embodiments, the activated compound:chitosan weight ratio is 1:1, 1:2, 1:3, 3:1, or 3:2 (e.g., 1:1, 4:5, 2:3, 1:2, 2:5, 1:3, 3:1, 5:4, or 3:2).

In certain embodiments, the composite membrane further comprises one or more of a carbon-based material, cellulose, or a non-ionic co-polymer.

The carbon-based material is selected from the group consisting of carbon nitrides, carbon-dots, carbon nanotubes, metal-organic framework (MOF) materials, zeolites, and graphenes.

In certain embodiments, set forth herein are multi-dimensional (e.g., nano-dimensional), inorganic transition metal carbides and carbonitrides (viz., MXenes). In certain embodiments, MXenes can be represented as $M_{n+1}X_n$, where M is an early transition metal, X is either carbon or nitrogen, and n is an integer from one to three. In certain embodiments, M includes an early transition metal in the periodic table of elements selected from Group 4 to Group 12. In certain embodiments, M is Ti. In certain embodiments, M is V. In certain embodiments, M is Cr. In certain embodiments, M is Mn. In certain embodiments, M is Fe. In certain embodiments, M is Co. In certain embodiments, M is Ni. In certain embodiments, M is Cu. In certain embodiments, M is Zn. In certain embodiments, M is Zr. In certain embodiments, M is Nb. In certain embodiments, M is Mo. In certain embodiments, M is Tc. In certain embodiments, M is Ru. In certain embodiments, M is Rh. In certain embodiments, M is Pd. In certain embodiments, M is Ag. In certain embodiments, M is Cd. In certain embodiments, M is Hf. In certain embodiments, M is Ta. In certain embodiments, M is W. In certain embodiments, M is Re. In certain embodiments, M is Os. In certain embodiments, M is Ir. In certain embodiments, M is Pt. In certain embodiments, M is Au. In certain embodiments, M is Hg. MXenes are typically prepared via etching atomically thin metal layers from MAX phases. In certain embodiments, MAX phases can be represented as $Ti_3AlX_2$, where X is either carbon or nitrogen, and etching is typically via aqueous fluoride. Following activation, MXene surfaces may terminate with a mixture of oxygen, hydroxide, and fluoride termini denoted as $T_x$, where, in certain embodiments, MXenes can be represented as $M_{(n+1)}X_nT_x$.

In certain embodiments, an MXene compound has the following formula $$Ti_3C_2T_x$$

wherein $C_2$ is carbon; and $T_x$ is O, F, OH, COOH, S, or Cl, or combinations thereof, wherein at least one of $T_x$ is oxygen or OH. In certain embodiments, $T_x$ is oxygen. In certain embodiments, $T_x$ is hydroxyl. In certain embodiments, $T_x$ is fluoride. In certain embodiments, $T_x$ is chloride.

In certain embodiments, set forth herein are compositions comprising chitosans. In certain embodiments, chitosans have variable molecular weights. In certain embodiments, the chitosan has a molecular weight of 50,000-190,000 Da. In certain embodiments, the chitosan has a molecular weight of 190,000-310,000 Da. In certain embodiments, the chitosan has a molecular weight of 310000-375000 Da. In certain embodiments, the chitosan is a hydrogel.

Composites

In certain embodiments, composites useful for the treatment of medium include certain embodiments of MXenes, as described herein, embedded within certain embodiments of chitosans, also as described herein. In certain embodiments of the composite, M is Ti, V, Cr, or Nb. In certain embodiments, M is Ti.

In certain embodiments of the composite, $T_x$ is oxygen. In certain embodiments of the composite, $T_x$ is oxygen or fluoride. In certain embodiments of the composite, $T_x$ is hydroxide and fluoride. In certain embodiments of the composite, $T_x$ is selected from hydroxide, oxygen, and fluoride.

In certain aspects and embodiments, the $M_{(n+1)}X_nT_x$ compounds in the composite include or can be characterized as nanoscale particles, and the nanoscale particles can be arranged in the form of nanosheets. In certain embodiments, the $M_{(n+1)}X_nT_x$ compounds have a nanoscale particle diameter. In certain embodiments, the $M_{(n+1)}X_nT_x$ compounds are arranged in the form of nanosheets. In certain embodiments, the nanosheets are zero-dimensional, one-dimensional, or two-dimensional. In certain embodiments, the nanosheets are zero-dimensional. In certain embodiments, the nanosheets are one-dimensional. In certain embodiments, the nanosheets are two-dimensional. In certain embodiments, the nanosheets can be porous or nonporous. In certain embodiments, the nanosheets are porous. In certain embodiments, the nanosheets are nonporous. In general, the nanosheets have a rigidity or flexibility. In certain embodiments, the two-dimensional nanosheets are characterized as flexible as the membraine could be fully folded without any cracking or disintegration.

In certain embodiments, the nanosheets (e.g., the two-dimensional nanosheets) are characterized with a tensile strength of 29 to 400 N/m (e.g., as measured by the tensile tester (Charra TA-XT2I Texture Analyzer)). The membranes (5 cm$^{2-}$) were tested and a clamp with a speed of 10 mm min$^{-1}$ and 10 N load cell. The membranes were deformed until the complete breakage. The tensile strength was calculated using the following equation:

Tensile strength$(N/M)$=[break force/cross-section area]×100

In certain embodiments, the two-dimensional $M_{(n+1)}X_nT_x$ nanosheets are embedded in a three-dimensional chitosan structure. In certain embodiments, the composite includes chitosan, wherein the chitosan is a hydrogel.

In certain embodiments, the composite nanosheets have chemical, electrical, surface, loading capacity, swelling, and antimicrobial characteristics that improve the usefulness of the composite in water treatment applications. In certain embodiments, the nanosheets are characterized with an electrical conductivity of 0.2-10×10$^{-2}$ S·cm$^{-1}$ (e.g., as measured by electrochemical impedance spectroscopy (SOLARTRON SI 1260 Impedance/Gain Phase Analyzer)).

In certain embodiments, when $T_x$ is OH, COOH, F, and/or S, the composite membrane is chemically and physically stable up to 180° C. (e.g., as measured by FTIR and TGA analysis).

In certain embodiments, the nanosheets are characterized by a surface area:volume ratio of 10-400 m$^2$·g$^{-1}$.

In certain embodiments, the composite functions under absorbtion and/or adsorption principles. A person of skill in the art would appreciate that an adsorbent composite structurally provides a process for material (e.g., pollutant) adhesion to the surface of the adsorbent composite. Alternatively stated, adsorption does not involve a process for incorporation—or absorbing—a pollutant material. Conversely, a person of skill in the art would appreciate that an absorbent composite structurally provides a process for material (e.g., pollutant) internalization within the absorbent composite. In other words, absorption takes a pollutant within the absorbent composite—not merely adhering to a surface of the composite as in adsorption. In certain embodiments, the nanosheets are characterized by an adsorption of 200-4000 cm$^3$g$^{-1}$ (e.g., as measured by nitrogen adsorption/desorption isotherms at 70-100 K on a Quantachrome Autosorb 1 instrument).

In certain embodiments, the nanosheets are characterized by an intercalation loading or capacity of 70-100% within 20 minutes (e.g., as measured by GC-FID). In certain embodiments, the nanosheets are characterized by an antimicrobial effect in the range of 20-100% against bacteria (e.g., as measured by a micro-plate reader. In certain embodiments, the antimicrobial effect is against gram negative bacteria. In certain embodiments, the antimicrobial effect is against gram positive bacteria. In certain embodiments, the bacteria can be selected from the group consisting of *Escherichia coli, salmonella enterica,* and *staphylococcus*. In certain embodiments, the bacteria is *Escherichia coli*. In certain embodiments, the bacteria is *salmonella enterica*. In certain embodiments, the bacteria is *staphylococcus*. In certain embodiments, the composite is portable. In certain embodiments, the composite is characterized by a swelling of 20-200% when the $M_{n+1}X_nT_x$ loading is 10-50% of chitosan (e.g., as measured by the Tea bag test).

In certain embodiments, the composite membrane further includes one or more carbon-based material, cellulose, and non-ionic co-polymer. In certain embodiments, the composite membrane further includes carbon-based material. In certain embodiments, the composite membrane further includes cellulose. In certain embodiments, the composite membrane further includes non-ionic co-polymer. In certain embodiments, the carbon-based material is selected from the group consisting of carbon nitrides, carbon-dots, carbon nanotubes, metal-organic framework (MOF) materials, zeolites, and graphenes. In certain embodiments, the carbon-based material is a carbon nitride. In certain embodiments, the carbon-based material is a carbon-dot. In certain embodiments, the carbon-based material is a carbon nanotube. In certain embodiments, the carbon-based material is a metal-organic framework (MOF) material. In certain embodiments, the carbon-based material is a zeolite. In certain embodiments, the carbon-based material is a graphene.

In certain embodiments, the nanosheets are characterized via water contact angle analysis. In certain embodiments, the average water contact angle is between 5° and 60°. In certain embodiments, the nanosheets are characterized by a surface hydrophilicity of 5° to 60° (e.g., 5°, 6°, 7°, 8°, 9°, 10°, 11°, 12°, 13°, 14°, 15°, 16°, 17°, 18°, 19°, 20°, 21°, 22°, 23°, 24°, 25°, 26°, 27°, 28°, 29°, 30°, 31°, 32°, 33°, 34°, 35°, 36°, 37°, 38°, 39°, 40°, 41°, 42°, 43°, 44°, 45°, 46°, 47°, 48°, 49°, 50°, 51°, 52°, 53°, 54°, 55°, 56°, 57°, 58°, 59°, or 60°; e.g., as measured by water contact angle).

In certain embodiments, the water contact angle is >90°. In certain embodiments, the average water contact angle is between 90° and 180°. In certain embodiments, the nanosheets are characterized by a surface hydrophobicity of >90°(e.g., 91°, 92°, 93°, 94°, 95°, 96°, 97°, 98°, 99°, 100°, 101°, 102°, 103°, 104°, 105°, 106°, 107°, 108°, 109°, 110°, 111°, 112°, 113°, 114°, 115°, 116°, 117°, 118°, 119°, 120°, 121°, 122°, 123°, 124°, 125°, 126°, 127°, 128°, 129°, 130°, 131°, 132°, 133°, 134°, 135°, 136°, 137°, 138°, 139°, 140°, 141°, 142°, 143°, 144°, 145°, 146°, 147°, 148°, 149°, 150°, 151°, 152°, 153°, 154°, 155°, 156°, 157°, 158°, 159°, 160°, 161°, 162°, 163°, 164°, 165°, 166°, 167°, 168°, 169°, 170°, 171°, 172°, 173°, 174°, 175°, 176°, 177°, 178°, 179°, 180°; e.g., as measured by water contact angle).

In certain embodiments, the composite chitosan has chemical and physical characteristics that improve the usefulness of the composite in water treatment applications. In certain embodiments of the composite, the chitosan is a hydrogel. In certain embodiments of the composite, the chitosan has a molecular weight of 50,000-190,000 Da. In certain embodiments of the composite, the chitosan has a molecular weight of 190,000-310,000 Da. In certain embodiments of the composite, the chitosan has a molecular weight of 310000-375000 Da. In certain embodiments of the composite, the $M_{n+1}X_nT_x$:chitosan weight ratio is 1:1, 1:2, 1:3, 3:1, and 3:2.

Methods for Treating a Medium

In certain aspects, provided herein are methods for treating and purifying a medium using any of the aspects and embodiments of composites described herein. Certain embodiments of any of the composites described elsewhere herein are contemplated to provide for the removal, or an improved removal, of pollutants from the treated medium (i.e., one or more phases or mixtures of phases, such as a contaminated liquid or gas, the phase or phases comprising one or more impurity compounds or pollutants). In certain aspects, the methods comprise removal of liquid organic pollutants compromise individual and mixed benzol, toluene, and ethylbenzene on the activated membrane with an activation ratio of 2:1.

In certain embodiments, the medium is selected from the group consisting of saline, wastewater, oil, or gaseous medium. In certain embodiments, the medium is wastewater, an oil medium, or a gaseous medium. In certain embodiments, the medium is wastewater. In certain embodiments, the medium is an oil or a liquid comprising an oil. In certain embodiments, the medium is a a gas. As would be appreciated by a person of skill in the art, pollutants can be dissolved in wastewater. Pollutants can also be dissolved in oil(s). Moreover, pollutants can be within a gaseous medium, for example, as volatilized pollutant species. In each of the medium described herein, the composites described herein can be used to remove pollutants from one or more of each medium. In certain embodiments, the wastewater includes industrial wastewater. In certain embodiments, the wastewater includes domestic wastewater.

In certain embodiments, the composite is used on an industrial scale. In certain embodiments, the composites are used on domestic scale (i.e., a smaller scale that is more appropriate for use in a house or multi-family residence such as an apartment).

In certain embodiments, the absorbing pollutants from the wastewater occurs at room temperature. In certain embodiments, the absorbing pollutants from the wastewater occurs at atmospheric pressure. In certain embodiments, the absorbing pollutants from the wastewater occurs at zero voltage. In certain embodiments, the absorbing pollutants from the wastewater is via ion exchange. In certain embodiments, the absorbing pollutants from the wastewater is via a diffusion rate of 0.001-1.0 cm$^2$ s$^{-1}$ (e.g., 0.001, 0.002, 0.003, 0.004, 0.005, 0.006, 0.007, 0.008, 0.009, 0.01, 0.015, 0.02, 0.025, 0.03, 0.035, 0.04, 0.05, 0.06, 0.07, 0.08, 0.09, 0.10, 0.12, 0.15, 0.18, 0.20, 0.22, 0.25, 0.28, 0.30, 0.35, 0.40, 0.45, 0.50, 0.55, 0.60, 0.65, 0.70, 0.75, 0.80, 0.85, 0.90, 0.95, or 1.0; e.g., as determined by measuring the increase in salt concentration in a cell chamber). In certain embodiments, the absorbing pollutants from the wastewater occurs at a swelling of 20-200% (e.g., 20, 25, 30, 35, 40, 45, 50, 55, 60, 65, 70, 75, 80, 85, 90, 95, 100, 105, 110, 115, 120, 125, 130, 140, 150, 160, 170, 180, 190, or 200%) when the $M_{n+1}X_nT_x$ loading is 10-50% (e.g., 10, 15, 20, 25, 30, 35, 40, 45, or 50%; e.g., as measured by a Tea bag test).

The methods for treating and purifying any medium described herein using any of the composites described herein remove pollutants including organic pollutants selected from the group consisting of phenol, benzene, xylene, toluene, and ethylbenzene, and/or inorganic pollutants selected from the group consisting of sulfide ($S^{2-}$), sulfate ($SO_4^{2-}$), $H_2SO_4$, HCl, and $HNO_3$. In certain embodiments, the organic pollutant is phenol. In certain embodiments, the organic pollutants are phenol and benzene. In certain embodiments, the organic pollutants are phenol and xylene. In certain embodiments, the organic pollutants are phenol and toluene. In certain embodiments, the organic pollutants are phenol and ethylbenzene. In certain embodiments, the organic pollutants are phenol, benzene, and xylene. In certain embodiments, the organic pollutants are phenol, benzene, and toluene. In certain embodiments, the organic pollutants are phenol, benzene, and ethylbenzene. In certain embodiments, the organic pollutants are phenol, benzene, xylene, and toluene. In certain embodiments, the organic pollutants are phenol, benzene, xylene, toluene, and ethylbenzene. In certain embodiments, the organic pollutant is benzene. In certain embodiments, the organic pollutants are benzene and xylene. In certain embodiments, the organic pollutants are benzene and toluene. In certain embodiments, the organic pollutants are benzene and ethylbenzene. In certain embodiments, the organic pollutants are benzene, xylene, and toluene. In certain embodiments, the organic pollutants are benzene, xylene, and ethylbenzene. In certain embodiments, the organic pollutants are benzene, xylene, toluene, and ethylbenzene. In certain embodiments, the organic pollutant is xylene. In certain embodiments, the organic pollutants are xylene and toluene. In certain embodiments, the organic pollutants are xylene and ethylbenzene. In certain embodiments, the organic pollutants are xylene, toluene, and ethylbenzene. In certain embodiments, the organic pollutants are phenol, xylene, and toluene. In certain embodiments, the organic pollutants are benzene, xylene, and toluene. In certain embodiments, the organic pollutants are phenol, xylene, toluene, and ethylbenzene. In certain embodiments, the organic pollutants are selected from the group consisting of toluene and ethylbenzene. In certain embodiments, the organic pollutant is ethylbenzene. In certain embodiments, the organic pollutant is toluene. In certain embodiments, the organic pollutant is toluene and ethylbenzene. In certain embodiments, the organic pollutant is a mixture of toluene and ethylbenzene. In certain embodiments, the organic pollutants are benzene, toluene, and ethylbenzene. In certain embodiments, the inorganic pollutant is sulfide ($S^{2-}$). In certain embodiments, the inorganic pollutants are selected from the group consisting of sulfide ($S^{2-}$) and sulfate ($SO_4^{2-}$). In certain embodiments, the inorganic pollutants are sulfide ($S^{2-}$) and sulfate ($SO_4^{2-}$). In certain embodiments, the inorganic pollutants are sulfide ($S^{2-}$) and $H_2SO_4$. In certain embodiments, the inorganic pollutants are sulfide ($S^{2-}$) and HCl. In certain embodiments, the inorganic pollutants are sulfide ($S^{2-}$) and $HNO_3$. In certain embodiments, the inorganic pollutants are sulfide ($S^{2-}$), sulfate ($SO_4^{2-}$), and $H_2SO_4$. In certain embodiments, the inorganic pollutants are sulfide ($S^{2-}$), sulfate ($SO_4^{2-}$), and HCl. In certain embodiments, the inorganic pollutants are sulfide ($S^{2-}$), sulfate ($SO_4^{2-}$), and $HNO_3$. In certain embodiments, the inorganic pollutants are sulfide ($S^{2-}$), sulfate ($SO_4^{2-}$), $H_2SO_4$, and HCl. In certain embodiments, the inorganic pollutants are sulfide ($S^{2-}$), sulfate ($SO_4^{2-}$), $H_2SO_4$, HCl, and $HNO_3$. In certain embodiments, the inorganic pollutant is sulfate ($SO_4^{2-}$). In certain embodiments, the inorganic pollutants are sulfate ($SO_4^{2-}$) and $H_2SO_4$. In certain embodiments, the inorganic pollutants are sulfate ($SO_4^{2-}$) and HCl. In certain embodiments, the inorganic pollutants are sulfate ($SO_4^{2-}$) and $HNO_3$. In certain embodiments, the inorganic pollutants are sulfate ($SO_4^{2-}$), $H_2SO_4$, and HCl. In certain embodiments, the inorganic pollutants are sulfate ($SO_4^{2-}$), $H_2SO_4$, and $HNO_3$. In certain embodiments, the inorganic pollutants are sulfate ($SO_4^{2-}$), $H_2SO_4$, HCl, and $HNO_3$. In certain embodiments, the inorganic pollutant is $H_2SO_4$. In certain embodiments, the inorganic pollutants are $H_2SO_4$ and HCl. In certain embodiments, the inorganic pollutants are $H_2SO_4$ and $HNO_3$. In certain embodiments, the inorganic pollutants are $H_2SO_4$, HCl, and $HNO_3$. In certain embodiments, the inorganic pollutants are sulfide ($S^{2-}$), $H_2SO_4$, and HCl. In certain embodiments, the inorganic pollutants are sulfate ($SO_4^{2-}$), $H_2SO_4$, and HCl. In certain embodiments, the inorganic pollutants are sulfide ($S^{2-}$), $H_2SO_4$, HCl, and $HNO_3$. In certain embodiments, the inorganic pollutant is $HNO_3$. In certain embodiments, the inorganic pollutant is HCl. In certain embodiments, the inorganic pollutants are HCl and $HNO_3$. In certain embodiments, the inorganic pollutants are sulfate ($SO_4^{2-}$) HCl, and $HNO_3$. In certain embodiments, the inorganic pollutants are sulfide ($S^{2-}$), HCl, and $HNO_3$. All other possible permutations in this paragraph, especially between organic and inorganic pollutant possibilities, are contemplated. In certain embodiments, the pollutants are toluene and ethylbenzene, and >70% of toluene and 40% of ethylbenzene are removed from the medium (e.g., the wastewater).

In certain embodiments, the organic pollutants are petroleum waste products selected from the group consisting of benzene, xylene, toluene, ethylbenzene, and combinations thereof. In certain embodiments, the petroleum waste product is benzene. In certain embodiments, the petroleum waste products are benzene and xylene. In certain embodiments, the petroleum waste products are benzene and toluene. In certain embodiments, the petroleum waste products are benzene and ethylbenzene. In certain embodiments, the petroleum waste products are benzene, xylene, and toluene. In certain embodiments, the petroleum waste products are benzene, xylene, toluene, and ethylbenzene. In certain embodiments, the petroleum waste product is xylene. In certain embodiments, the petroleum waste products are xylene and toluene. In certain embodiments, the petroleum waste products are xylene and ethylbenzene. In certain embodiments, the petroleum waste product is toluene. In certain embodiments, the petroleum waste products are toluene ethylbenzene. In certain embodiments, the petroleum waste products are toluene, ethylbenzene, and benzene. In certain embodiments, the petroleum waste product is ethylbenzene. In certain embodiments, the petroleum waste products are ethylbenzene, toluene, and xylene.

In certain embodiments, the organic pollutants are in process water or produced water comprising phenol-based pollutants selected from the group consisting of phenol, p-chlorophenol, and p-nitrophenol. In certain embodiments, the organic pollutants are in process water comprising phenol-based pollutants selected from the group consisting of phenol, p-chlorophenol, and p-nitrophenol. In certain embodiments, the organic pollutants are in process water where the phenol-based pollutants are phenol, p-chlorophenol, and p-nitrophenol. In certain embodiments, the organic pollutants are in process water where the phenol-based pollutant is phenol. In certain embodiments, the organic pollutants are in process water where the phenol-based pollutant is p-chlorophenol. In certain embodiments, the organic pollutants are in process water where the phenol-based pollutant is p-nitrophenol. In certain embodiments, the organic pollutants are in produced water comprising phenol-based pollutants selected from the group consisting of phenol, p-chlorophenol, and p-nitrophenol. In certain embodiments, the organic pollutants are in produced water where the phenol-based pollutants are phenol, p-chlorophenol, and p-nitrophenol. In certain embodiments, the organic pollutants are in produced water where the phenol-based pollutants is phenol. In certain embodiments, the organic pollutants are in produced water where the phenol-based pollutants is p-chlorophenol. In certain embodiments, the organic pollutants are in produced water where the phenol-based pollutants is p-nitrophenol. In certain embodiments, the organic and/or inorganic pollutants are adsorbed from the process water or produced water comprising the phenol-based pollutants. In certain embodiments, the organic and/or inorganic pollutants are adsorbed from the process water comprising the phenol-based pollutants. In certain embodiments, the organic and inorganic pollutants are adsorbed from the process water comprising the phenol-based pollutants. In certain embodiments, the organic pollutants are adsorbed from the process water comprising the phenol-based pollutants. In certain embodiments, the inorganic pollutants are adsorbed from the process water comprising the phenol-based pollutants. In certain embodiments, the organic and/or inorganic pollutants are adsorbed from the produced water comprising the phenol-based pollutants. In certain embodiments, the organic and inorganic pollutants are adsorbed from the produced water comprising the phenol-based pollutants. In certain embodiments, the organic pollutants are adsorbed from the produced water comprising the phenol-based pollutants. In certain embodiments, the inorganic pollutants are adsorbed from the produced water comprising the phenol-based pollutants. In certain embodiments, the organic and/or inorganic pollutants are adsorbed from process water or produced water. In certain embodiments, the organic and/or inorganic pollutants are adsorbed from process water. In certain embodiments, the organic and inorganic pollutants are adsorbed from process water. In certain embodiments, the organic pollutants are adsorbed from process water. In certain embodiments, the inorganic pollutants are adsorbed from process water. In certain embodiments, the organic and/or inorganic pollutants are adsorbed from produced water. In certain embodiments, the organic and inorganic pollutants are adsorbed from produced water. In certain embodiments, the organic pollutants are adsorbed from produced water. In certain embodiments, the inorganic pollutants are adsorbed from produced water.

In certain embodiments, the pollutants are further characterized by total pesticides (0.5-100 µg/L), and/or fecal coliforms for gram negative or gram positive bacteria of $1$-$10^{13}$ units per 100 mL. In certain embodiments, the pollutants are further characterized by total pesticides (0.5-100 µg/L), and fecal coliforms for gram negative or gram positive bacteria of $1$-$10^{13}$ units per 100 mL. In certain embodiments, the pollutants are further characterized by total pesticides (0.5-100 µg/L).. In certain embodiments, the pollutants are further characterized by fecal coliforms for gram negative or gram positive bacteria of $1$-$10^{13}$ units per 100 mL. In certain embodiments, the pollutants are further characterized by fecal coliforms for gram negative bacteria of $1$-$10^{13}$ units per 100 mL. In certain embodiments, the pollutants are further characterized by fecal coliforms for gram positive bacteria of $1$-$10^{13}$ units per 100 mL. In certain embodiments, the pollutants are further characterized by total pesticides (0.5-100 µg/L). In certain embodiments, the pollutants are further characterized by total pesticides (0.5-100 µg/L), and fecal coliforms for gram negative bacteria of $1$-$10^{13}$ units per 100 mL. In certain embodiments, the pollutants are further characterized by total pesticides (0.5-100 µg/L), and fecal coliforms for gram positive bacteria of $1$-$10^{13}$ units per 100 mL. In certain embodiments, the pollutants are further characterized by fecal coliforms for gram negative bacteria of $1$-$10^{13}$ units per 100 mL. In certain embodiments, the organic pollutants are further characterized by total organic carbon (TOC) of 100 ppb-10 ppm.

In certain embodiments, the pollutants are characterized by a biochemical oxygen demand (BOD) of 3-8 mg/L, dissolved oxygen (DO) of 4-9 mg/L, total dissolved solids (TDS) of 500-1000 mg/L, and/or total suspended solids (TSS) of 10-28 mg/L. In certain embodiments, the pollutants are characterized by a biochemical oxygen demand (BOD) of 3-8 mg/L, dissolved oxygen (DO) of 4-9 mg/L, total dissolved solids (TDS) of 500-1000 mg/L, and total suspended solids (TSS) of 10-28 mg/L. In certain embodiments, the pollutants are characterized by a biochemical oxygen demand (BOD) of 3-8 mg/L. In certain embodiments, the pollutants are characterized by dissolved oxygen (DO) of 4-9 mg/L. In certain embodiments, the pollutants are characterized by total dissolved solids (TDS) of 500-1000 mg/L. In certain embodiments, the pollutants are characterized by total suspended solids (TSS) of 10-28 mg/L.

In certain embodiments, the methods using the composites described herein enable the absorption or adsorption of pollutants from media quickly and efficiently. For example, in certain embodiments, the adsorbing pollutants from wastewater removes the pollutants in less than twenty minutes. In certain embodiments, the adsorbing pollutants from wastewater removes the pollutants in less than seventeen minutes. In certain embodiments, the adsorbing pollutants from wastewater removes the pollutants in 16.5 minutes. In certain embodiments, the adsorbing pollutants from wastewater removes the pollutants in two minutes. In certain embodiments, the absorbing or adsorbing of the pollutants can be tested under light irradiation sources.

In certain embodiments of the methods described herein, the activated compounds embedded in chitosan further comprise one or more carbon-based materials, celluloses, and non-ionic co-polymers. Without being bound by any particular theory, these additional components enhance the removal of any of the pollutants described herein. In certain embodiments, the activated $M_{n+1}X_nT_x$ compounds embedded in chitosan comprise one or more carbon-based materials. In certain embodiments, the activated $M_{n-1}X_nT_x$ compounds embedded in chitosan comprise celluloses. In certain embodiments, the activated $M_{n+1}X_nT_x$ compounds embedded in chitosan comprise non-ionic co-polymers. In certain embodiments, the carbon-based material is selected from the group consisting of carbon nitrides, carbon-dots, carbon nanotubes, metal-organic framework (MOF) materials, zeolites, and graphenes. In certain embodiments, the carbon-based material is a carbon nitride. In certain embodiments, the carbon-based material is a carbon-dot. In certain embodiments, the carbon-based material is a carbon nanotube. In certain embodiments, the carbon-based material is a metal-organic framework (MOF) material. In certain embodiments, the carbon-based material is a zeolite. In certain embodiments, the carbon-based material is a graphene.

Methods of Treating and Desalinating Water

In certain aspects, provided herein are methods of treating and desalinating water using any of the composites described herein. Certain embodiments of any of the composites described elsewhere herein are contemplated to provide for treating and desalinating water. Applicants contemplate that certain embodiments of the composites described elsewhere herein provide for improved removal of salts from the treated saline (e.g., thereby producing water sufficiently pure for other uses or a more dilute saline). In certain aspects, the methods comprise desalinating water with a salt concentration ranged from 1000 ppm to 35000 ppm at room temperature on the activated membrane with an activation ratio of 2/1. In certain embodiments, the saline includes industrial-scale saline. In certain embodiments, the saline includes domestic saline. In certain embodiments, the absorbing saline pollutants from the saline occurs at room temperature. In certain embodiments, the absorbing saline pollutants from the saline occurs at atmospheric pressure. In certain embodiments, the absorbing saline pollutants from the saline occurs at zero voltage.

In certain aspects, provided herein is a method for purifying a medium comprising treating the medium with a composite membrane as otherwise disclosed herein; and adsorbing pollutants from the medium (e.g., thereby providing a medium with a lower concetration of the pollutants adsorbed).

In certain aspects, provided herein is a method for purifying a medium comprising treating the medium with an activated compound embedded in chitosan (e.g., in nanosheets comprising the activated compound), wherein the activated compound is of formula $M_{(n+1)}X_nT_x$ wherein $M_{(n+1)}$ comprises an early transition metal from Group 4 to Group 12 in the periodic table;

$X_n$ comprises carbon and/or nitrogen;

$T_x$ comprises O, F, OH, COOH, S, or Cl, or combinations thereof, wherein at least one of $T_x$ is oxygen or OH; and n and x are each an independently selected integer selected from the group consisting of 1, 2, and 3; and adsorbing pollutants from the medium.

In certain embodiments, the medium is selected from the group consisting of wastewater, an oil medium, or a gaseous medium. In certain embodiments, the medium is gaseous. In certain embodiments, the medium is wastewater. In certain embodiments, the wastewater comprises industrial wastewater or domestic wastewater. In certain embodiments, the medium is oil. In certain embodiments, the medium is gaseous.

In certain embodiments, the composite used in the method is a composition as otherwise embodied herein.

In certain embodiments, the adsorbing pollutants from the wastewater occurs at room temperature.

In certain embodiments, the adsorbing pollutants from the wastewater occurs at atmospheric pressure.

In certain embodiments, the adsorbing pollutants from the wastewater occurs at zero voltage.

In certain embodiments, the adsorbing pollutants from the wastewater is via ion exchange.

In certain embodiments, the adsorbing pollutants from the wastewater is via a diffusion rate of 0.001-1.0 cm$^2$ s$^{-1}$ determined by measuring the increase in salt concentration in a cell chamber.

In certain embodiments, the adsorbing pollutants from the wastewater occurs at a swelling of 20-200% when the $M_{n+1}X_nT_x$ loading is 10-50% (e.g., as measured by a Tea bag test).

In certain embodiments, the pollutants (e.g., organic and/or inorganic pollutants) are adsorbed from the process water or produced water comprising the phenol-based pollutants. In certain embodiments, the organic and/or inorganic pollutants are adsorbed from process water or produced water.

In certain embodiments, the pollutants comprise organic pollutants selected from the group consisting of phenol, benzene, xylene, toluene, and ethylbenzene, and/or inorganic pollutants selected from the group consisting of sulfide ($S^{2-}$), sulfate ($SO_4^{2-}$), $H_2SO_4$, HCl, and $HNO_3$.

In certain embodiments, the organic pollutants are selected from the group consisting of toluene and ethylbenzene. In certain embodiments, the organic pollutant is toluene. In certain embodiments, the organic pollutant is ethylbenzene. In certain embodiments, the organic pollutant is a mixture of toluene and ethylbenzene. In certain embodiments, the organic pollutants are petroleum waste products selected from the group consisting of benzene, xylene, toluene, ethylbenzene, and combinations thereof.

In certain embodiments, the medium is process water or produced water comprising phenol-based pollutants selected from the group consisting of phenol, p-chlorophenol, and p-nitrophenol.

In certain embodiments, the pollutants are organic. In certain embodiments, the pollutants are selected from the group consisting of phenol, p-chlorophenol, and p-nitrophenol.

In certain embodiments, the pollutants are inorganic. In certain embodiments, the pollutants are selected from the group consisting of sulfide ($S^{2-}$) and sulphate ($SO_4^{2-}$).

In certain embodiments, the pollutants are further characterized by total pesticides (0.5-100 μg/L) and/or fecal coliforms for gram negative or gram positive bacteria of $1\text{-}10^{13}$ units per 100 mL.

In certain embodiments, the organic pollutants are further characterized by total organic carbon (TOC) of 100 ppb-10 ppm.

In certain embodiments, the pollutants are characterized by a biochemical oxygen demand (BOD) of 3-8 mg/L, dissolved oxygen (DO) of 4-9 mg/L, total dissolved solids (TDS) of 500-1000 mg/L, and/or total suspended solids (TSS) of 10-28 mg/L.

In certain embodiments, the adsorbing pollutants from the wastewater removes the pollutants in less than twenty minutes. In certain embodiments, the adsorbing pollutants from the wastewater removes the pollutants in less than seventeen minutes. In certain embodiments, the adsorbing pollutants from the wastewater removes the pollutants in 16.5 minutes. In certain embodiments, the adsorbing pollutants from the wastewater removes the pollutants in two minutes.

In certain embodiments, the pollutants are toluene and ethylbenzene, and >70% of toluene and 40% of ethylbenzene are removed from the wastewater.

In certain embodiments, the activated compounds embedded in chitosan further comprise one or more carbon-based materials, celluloses, and non-ionic co-polymers.

In certain embodiments, the carbon-based material is selected from the group consisting of carbon nitrides, carbon-dots, carbon nanotubes, metal-organic framework (MOF) materials, zeolites, and graphenes.

In certain embodiments, the adsorbing pollutants are tested under light irradiation sources, such as an ozone-free xenon lamp ((100 mW/cm$^{2-}$), Abet Technologies, USA).

Method for Desalinating Water

In certain aspects, provided herein is a method for desalinating water comprising treating saline with a composite membrane as otherwise disclosed herein; and adsorbing saline pollutants from the saline (e.g., thereby providing water or a more dilute saline).

In certain aspects, provided herein is a method for desalinating water comprising treating saline with an activated compound embedded in chitosan, wherein the activated compound is of formula $M_{(n+1)}X_nT_x$ $M_{(n+1)}$ comprises an early transition metal from Group 4 to Group 12 in the periodic table;

$X_n$ comprises carbon and/or nitrogen;

$T_x$ comprises O, F, OH, COOH, S, or Cl, or combinations thereof, wherein at least one of Tx is oxygen or OH; and n and x are each an integer independently selected from the group consisting of 1, 2, and 3;

adsorbing saline pollutants from the saline (e.g., thereby providing water or a more dilute saline).

In certain embodiments, the activated compound or composite membrane is an aspect or embodiment as otherwise disclosed herein.

In certain embodiments, the saline comprises industrial-scale saline or domestic saline.

In certain embodiments, the chitosan is a hydrogel.

In certain embodiments, the adsorbing saline pollutants from the saline occurs at room temperature.

In certain embodiments, the adsorbing pollutants from the saline occurs at atmospheric pressure.

In certain embodiments, the adsorbing saline pollutants from the saline is via capacitive deionization, where the ions are electrosorbed via the electrical double layers mechanism. In certain embodiments, this is achieved by using two membranes (5 cm $^{2-}$) as an anode and a cathode, which are dipped in 200 mL of saline water (500-35000 ppm of NaCl) under an applied electrical potential (e.g., provided by DC Power Supply (TWINTEX, TP1H-3S, China)) at room temperature. At interval time (each 10 sec), 1 mL saline water was withdrawn and analyzed by the ion chromatography (IC) (Dionex ICS-6000, Thermo Scientific™)

In certain embodiments, the removal of salts from the saline can occur when the chitosan is an electrode. In certain embodiments, the chitosan is an electrode. In certain embodiments, the adsorbing saline pollutants from the saline occurs at about 0.8-1.5 V (e.g., about 0.8, 0.9, 1.0, 1.1, 1.2, 1.3, 1.4, or 1.5 V) (e.g., provided by DC Power Supply (TWINTEX, TP1H-3S, China)) under a constant current of 1 A and at room temperature.

In certain embodiments, the methods for treating and desalinating water remove saline pollutants selected from the group consisting of sodium chloride, carbonates, and phosphates. In some embodiments, the saline pollutants are sodium chloride (NaCl). In certain embodiments, the saline pollutants are carbonates (e.g., $Na_2CO_3$, $NaHCO_3$). In certain embodiments, the saline pollutants are phosphates (e.g., $Na_3PO_4$, $Na_2HPO_4$, $NaH_2PO_4$).

In some embodiments, the saline pollutants are characterized by a salinity level of 500-35000 ppm NaCl (e.g., less than or about 500, 600, 700, 750, 800, 900, 1000, 1100, 1250, 1500, 1750, 2000, 2250, 2500, 2750, 3000, 3250, 3500, 3750, 4000, 4250, 4500, 5000, 6000, 7000, 8000, 9000, 10000, 11000, 12000, 13000, 14000, 15000, 17500, 20000, 22500, 25000, 27500, 30000, 32500, or 35000 ppm NaCl).

In certain embodiments, the methods for treating and desalinating water using any of the composites described herein remove saline pollutants quickly and efficiently. In certain embodiments, the adsorbing saline pollutants from the saline (i.e., the salt solution) removes the saline pollutants in about, or less than, twenty minutes. In certain embodiments, the adsorbing saline pollutants from the saline removes the saline pollutants in less than seventeen minutes. In certain embodiments, the adsorbing saline pollutants from the saline removes the saline pollutants in about 16.5 minutes. In certain embodiments, the adsorbing saline pollutants from the saline removes the saline pollutants in about two minutes.

EXAMPLES

Provided herein are exemplary compounds, composites, compositions, and methods for purifying wastewater and/or desalinating water. Also provided herein are exemplary methods of preparing the compounds, composites, and compositions described herein.

Certain embodiments of the invention are illustrated by the following non-limiting examples. As used herein, the symbols and conventions used in these processes, schemes, and examples, regardless of whether a particular abbreviation is specifically defined, are consistent with those used in the contemporary scientific literature, e.g., the Journal of the American Chemical Society or Applied Surface Science. Specifically, but without limitation, the following abbreviations may be used in the Examples, and throughout the specification:

| Abbreviation | Term or Phrase |
|---|---|
| Aq. | Aqueous |
| Boc | N-tert-butoxycarbonyl |
| DCM | Dichloromethane |
| DIPEA | Diisopropylethylamine |
| ELSD | Evaporative light scattering detector |
| ESI | Electrospray ionization |
| Fmoc | N-(9-fluorenylmethyloxycarbonyl) |
| HATU | 2-(7-Aza-1H-benzotriazole-1-yl)-1,1,3,3-tetramethyluronium hexafluorophosphate |
| HPLC | High performance liquid chromatography |
| IC | Ion chromatography |
| hr, h, or hrs | Hours |
| LC | Liquid chromatography |
| MALDI | Matrix-assisted laser desorption/ionization |
| MS | Mass spectrometry |
| MsCl | Methanesulfonyl chloride |
| MSD | Mass-selective detector |
| MW | Molecular weight |
| NHS | N-hydroxy succinimide |
| ppm | Parts per million |
| RP | Reversed phase |
| rt | room temperature |
| SEC | Size exclusion chromatography |
| TEA | Triethylamine |
| TMS | tetramethylsilane |

-continued

| Abbreviation | Term or Phrase |
|---|---|
| TFA | Trifluoroacetic acid |
| TOF | Time-of-flight |
| UPLC | Ultra Performance Liquid Chromatography |
| UV | Ultraviolet |

Material and Methods

Aluminum titanium carbide powder MAX-phase ($Ti_3AlC_2$, 98%) was purchased from Carbon-Ukraine Ltd. Dimethyl sulfoxide (DMSO, 99.7%) was obtained from Fisher Scientific International, Inc. Hydrofluoric acid (HF, 48%) was obtained from VWR Chemicals BDH. Sodium hydroxide (NaOH, 99.9%), and chitosan (190,000-310,000 Da) were purchased from Sigma-Aldrich Chemie GmbH (Munich, Germany). All chemicals were used as received without any modifications.

Preparation of Activated $Ti_3C_2T_x$ MXene (T=F, O, and OH; x is an integer from 1 to 3)

Two-dimensional $Ti_3C_2T$ nanosheets were typically prepared via mixing 1 g of $Ti_3C_2Al$ Max phase in 10 mL HF (48%) with stirring for 24 h at room temperature to chemically erode the Al metal. The obtained mixture was purified through repeated cycles (ca. 10 times) of centrifugation at 4000 rpm and washing with double deionized water (DDI-$H_2O$) until the supernatant was pH 5. The solid phase was left to dry at 40° C. for 12 hours.

The obtained powder was mixed with DMSO (12 mL) for intercalation under stirring for 24 hours at room temperature, followed by the addition of DDI-$H_2O$ (30 mL) and centrifugation at 3500 rpm for 5 minutes (repeated 5×) to isolate the intercalated MXene powder. The resultant powder was directly redispersed in DDI-$H_2O$ (300 mL) under ultrasonic treatment at room temperature for 5 h. The final $Ti_3C_2$ product was purified by consecutive cycles of centrifugation (3500 rpm) and washing with DDI-$H_2O$ (repeated 5×).

For the activation process, 1 g of $Ti_3C_2$ nanosheets were mixed with 5% NaOH (10 mL) under stirring at room temperature for 4 hours. The activation degree was controlled to be 1:1, 1:2, and 2:1 by using 5%, 10%, and 2.5% NaOH, respectively.

Fabrication of Membrane

Chitosan hydrogel was initially prepared via dissolving chitosan (4 g) in aq. acetic acid (20% v/v, 100 mL) with mechanical stirring at room temperature. Activated $Ti_3C_2T_x$ nanosheets (1 g in 5 mL DDI-$H_2O$) were added dropwise into the chitosan hydrogel with mechanical stirring and then sonication to remove any air bubbles. The obtained hydrogel was casted onto a glass plate using a doctor blade (drawdown thickness up to 2 mm) for 1 min. The casted membrane was dried in an oven under vacuum at 40° C. for 24 h. The dried membrane was neutralized with NaOH solution and then dried under air 40° C. before any further use or characterization.

Characterization

The shape and composition of the prepared materials were investigated using a transmission electron microscope (TEM, TecnaiG220, FEI, Hillsboro, Oreg., USA) and a scanning electron microscope (SEM, Hitachi S-4800, Hitachi, Tokyo, Japan) equipped with an energy dispersive spectrometer (EDS). The X-ray photoelectron spectroscopy (XPS) was measured on a Kratos Axis (Ultra DLD XPS Kratos, Manchester, UK) equipped with a monochromatic Al Kα radiation source (1486.6 eV) under a UHV environment (ca. 5×10$^{-9}$ Torr). The X-ray diffraction pattern (XRD) was investigated on an X-ray diffractometer (X'Pert-Pro MPD, PANalytical Co., Almelo, Netherlands) using Cu Kα X-ray source ($\lambda$=1.540598 Å).

Water and Saline Free Swelling Capacity (FSC)

The free swelling capacity of the samples was determined with the "tea bag" test, according to the standard procedure as referenced in NWSP 240.0.R2. Particularly, the tea-bag protocol including weight and placing the initial membrane "$W_0$" into a tea bag (acrylic/polyester gauze with fine meshes). Then the bag is dipped in saline water solution (1 wt. % NaCl) for 20 min followed by removing the bag from water every 1 min and place it on a cloth sheet to remove the un-adsorbed saline water. The tea bag is weighted again "$W_1$". The empty bag is also dipped in water and then weighted "$W_2$". The swelling capacity "St" was calculated every 1 min using the following equation:

$$S_t = [(W_2-W_1-W_0)/(W_0)]X\%$$

Removal Efficiency

The membranes were individually dipped in a water solution containing the pollutant (e.g., ethylbenzene or toluene) with a final concentration of 100 ppm. Every 2 min, 2 ml of the water solution was withdrawn and analyzed by using Perkin Elmer Clams 680-GC-FID with TurboMatrix Headspace Sampler and TotalChrom Workstation Software. The removal efficiency was calculated using the following equation:

$$\text{Removal \%} = \left[\frac{(C_0 - C_t)}{C_0}\right] \times 100$$

where $C_0$ is the concentration at to, and $C_t$ is the measured concentration at a specific time.

Results and Discussion

FIG. 1 shows the SEM images of the as-synthesized materials—more specifically, SEM images of (A) $Ti_3AlC_2$, (B) $Ti_3C_2T_x$ before delamination, (C) $Ti_3C_2T_x$ after delamination, and (D) activated $Ti_3C_2T_x$. FIGS. 1E and 1F show multidimensional membranes at different magnifications. The highly stacked sheets of $Ti_3AlC_2$ Max phase (FIG. 1A) were converted into multilayered sheets after eroding of the Al to produce $Ti_3C_2$ MXene. After intercalation with DMSO and delamination under ultrasonic treatment, the obtained nanosheets were exfoliated (FIG. 1C). Finally, after activation with aq. NaOH, uniform and exfoliated two-dimensional $Ti_3C_2T_x$ (T=F, O, and OH) nanosheets were obtained that were assembled akin to a porous structure (FIG. 1D). After embedding $Ti_3C_2T_x$ nanosheets into the chitosan hydrogel, an ordered membrane was formed without any cracking or distortion (FIG. 1E). The surface of the membrane contains a multidimensional wavy-like structure, and MXene nanosheets were uniformly distributed or embedded into the membrane as indicated by the circles in FIG. 1F.

Figure 2A:
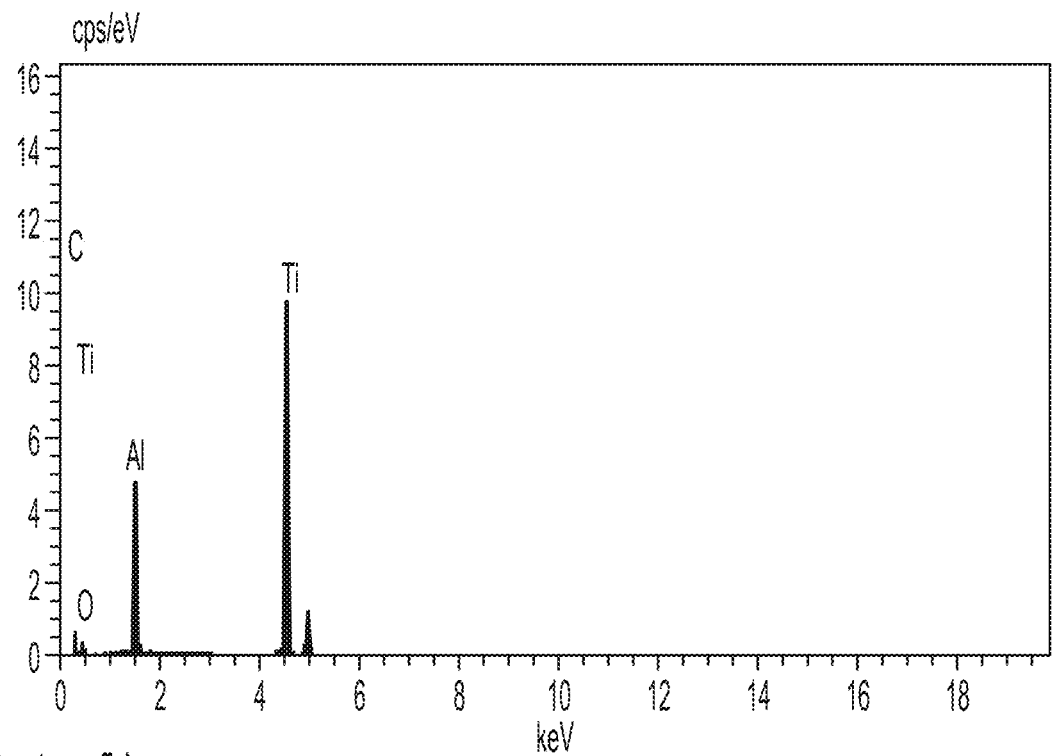
FIGS. 2A-2C show energy dispersive X-ray (EDX) analysis of (A) $Ti_3AlC_2$ and (B) $Ti_3C_2T_x$ MXene-multidimensional membranes, and (C) element mapping analysis of activated $Ti_3C_2T_x$ MXene multidimensional membrane.
Figure 2B:
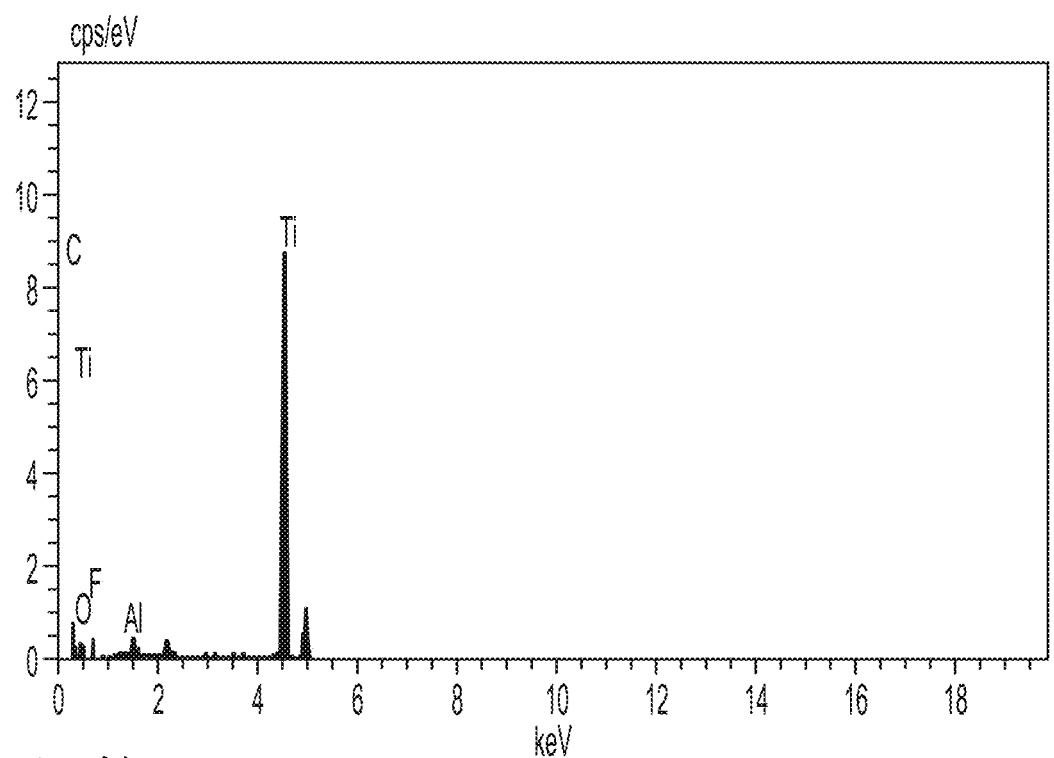
Figure 2C:
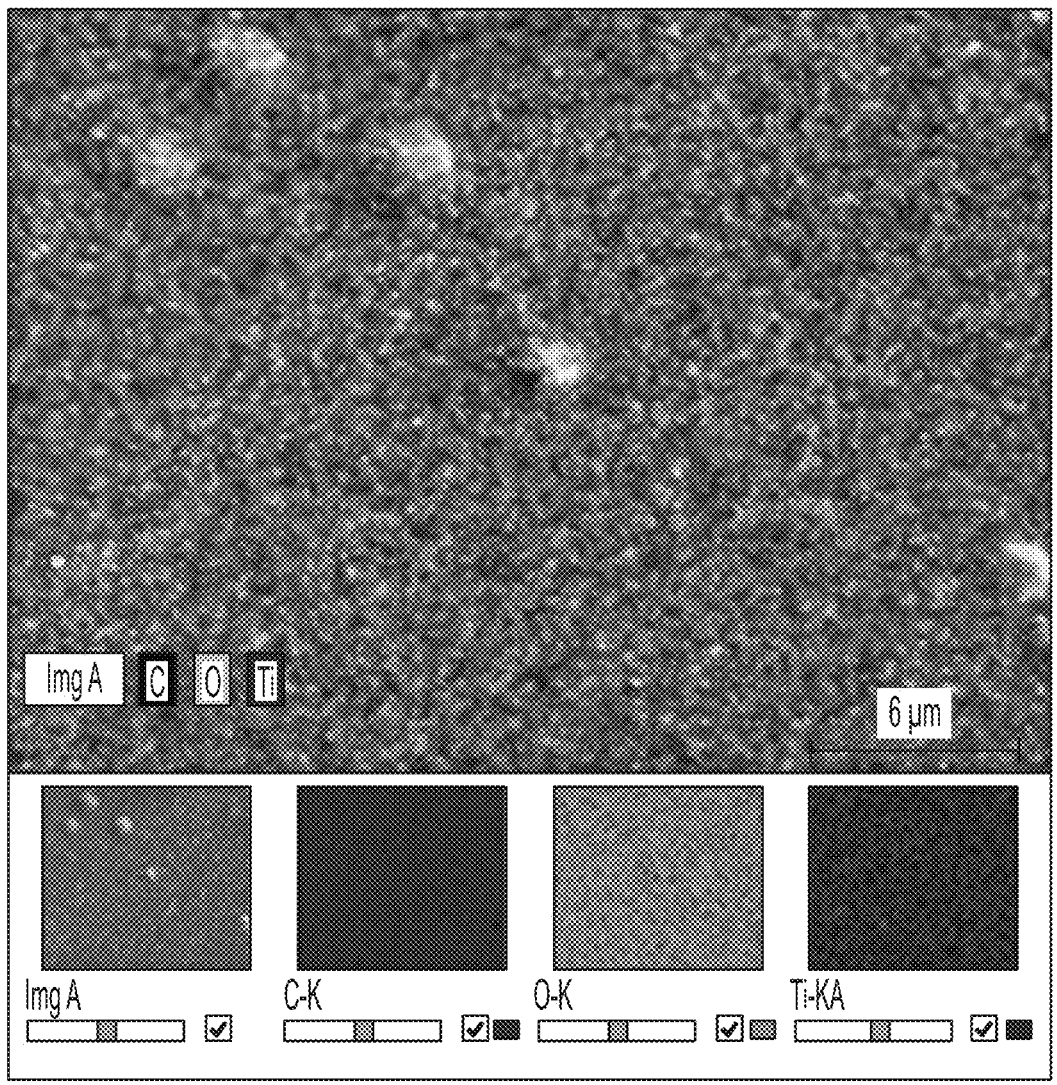

FIGS. 2A and 2B show the EDX analysis of $Ti_3AlC_2$ MXene-multidimensional membranes, which clearly displayed the successful selective etching of Al by HF as well as introducing various surface functionalities such as F and O. The element mapping analysis displayed the production of a uniform membrane with uniform distribution of C, Ti, and O (FIG. 2C).

Figure 3A:
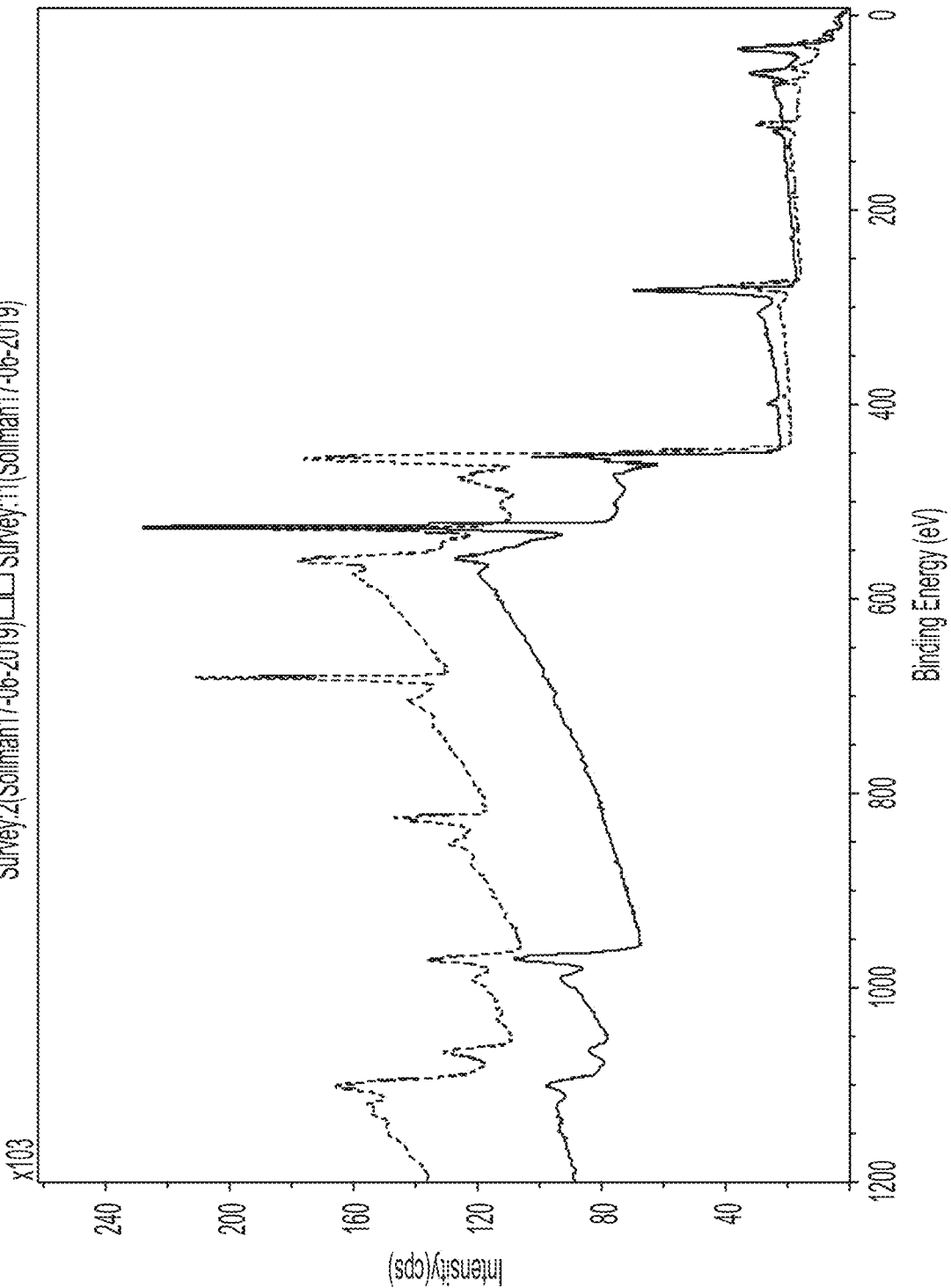
Figure 4:
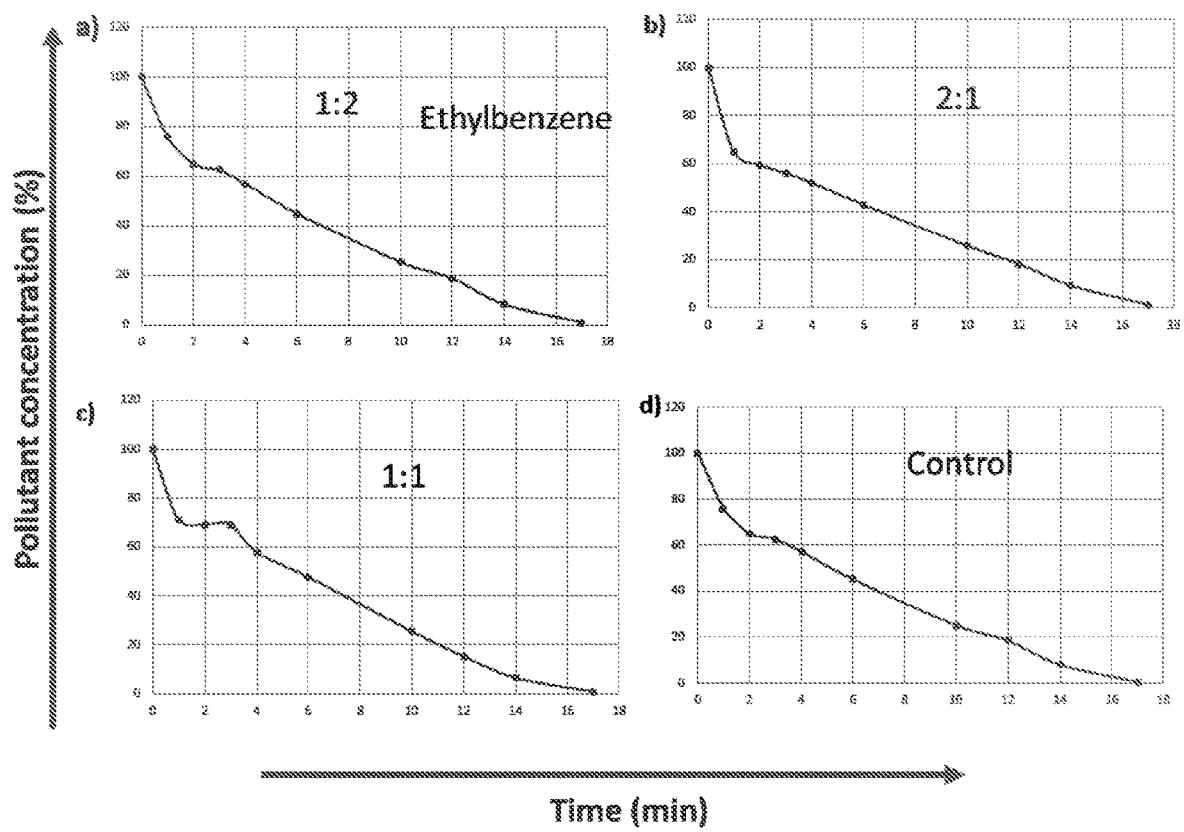
FIGS. 4A-4D show removal efficiencies of ethylbenzene using the nanosystems disclosed herein.

FIG. 3A shows an XPS survey of $Ti_3AlC_2$ and (b) $Ti_3C_2Tx$ MXene multidimensional membranes. The membrane contains Ti, C, O, F, whereas $Ti_3AlC_2$ contains only Ti, Al, and C. The detailed composition of each element is shown in FIG. 3B.

FIGS. 4A-4D show the removal efficiency of the disclosed nanosystems for ethylbenzene, as measured by GC-FID, as a function of activation (e.g., (a) (1:2), (b) (2:1), (c) (1:1), and (d) non-activated control membrane). All of the membranes displayed nearly complete removal of ethylbenzene within approximately 17 min with only a slight difference between the activated membranes used.

Figure 5:
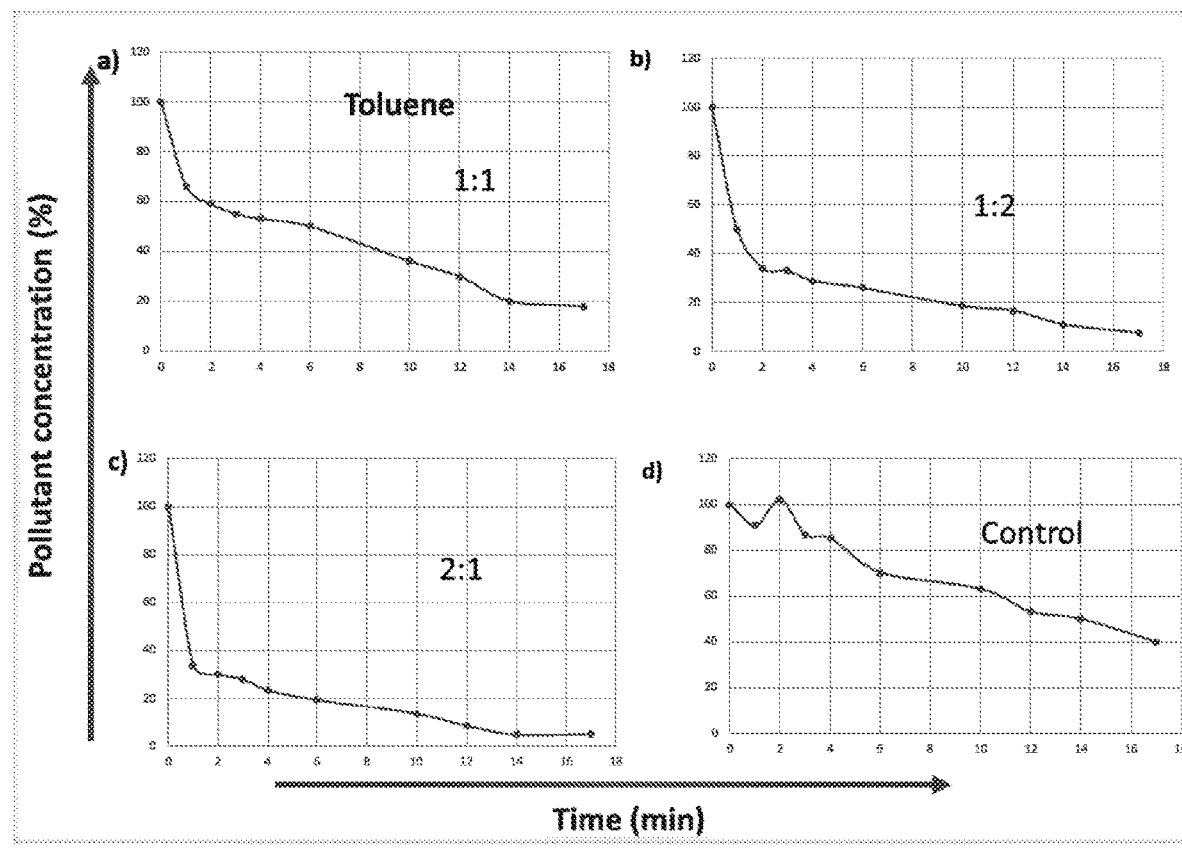
FIGS. 5A-5D show removal efficiencies of toluene using the nanosystems disclosed herein.

FIGS. 5A-5D show the removal efficiency of the disclosed nanosystems for toluene as a function of activation (e.g., (a) (1:1), (b) (1:2), (c) (2:1), and (d) non-activated control membrane). The 1:1 activated membrane achieved approximately 50% removal of toluene at four minutes (FIG. 5A). The 1:2 activated membrane achieved approximately 75% removal of toluene at four minutes (FIG. 5B). The 2:1 activated membrane achieved approximately 78% removal of toluene at four minutes (FIG. 5C). The non-activated control membrane achieved approximately 8% removal of toluene at four minutes (FIG. 5D). While the removal kinetics appear slightly less with the 1:1 membrane, which achieved approximately 50% removal of toluene within only 4 min, the results for the 1:1 membrane were significantly superior to the non-activated control membranes, which achieved only 8% removal of toluene after 4 min. The removal kinetics for the activated membranes were in the order of 2:1>1:2>1:1. Interestingly, the 2:1 membrane removed approximately 70% toluene within only two minutes, and the 1:2 membrane removed approximately 65% of the toluene within only 2 min.

What is claimed is:

1. A composite membrane comprising
   chitosan; and
   a plurality of nanoparticles comprising an activated compound of formula

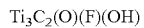
   $Ti_3C_2(O)(F)(OH)$ wherein the plurality of nanoparticles is arranged in atomically thin two-dimensional nanosheets;
   wherein the two-dimensional nanosheets are embedded in a three-dimensional chitosan structure;
   wherein the activated compound is activated by aqueous base treatment; and
   wherein the activated compound:chitosan weight ratio is from 2:1 to 1:2.

2. The composite membrane of claim 1, wherein the nanosheets are characterized by an electrical conductivity from $0.2 \times 10^{-2}$ S·cm$^{-1}$ to $10 \times 10^{-2}$ S·cm$^{-1}$.

3. The composite membrane of claim 1, wherein the nanosheets are-characterized by a water contact angle from 5° to 60°.

4. The composite membrane of claim 1, wherein the nanosheets are characterized by a surface area:volume ratio from 10 to 400 m$^2$g$^{-1}$.

5. The composite membrane of claim 1, wherein the nanosheets are characterized by an adsorption from 200 to 4000 cm$^3$g$^{-1}$ as measured by nitrogen adsorption/desorption isotherms at 70-100 K.

6. The composite membrane of claim 1, wherein the nanosheets have an intercalation loading or capacity of 70-100%.

7. The composite membrane of claim 1, wherein the activated compound:chitosan weight ratio is 1:1, 1:2, or 3:2.

8. The composite membrane of claim 1, further comprising one or more of a carbon- based material, cellulose, or a non-ionic co-polymer.

9. A method for purifying a medium comprising
   treating the medium with a composite membrane of claim 1; and
   adsorbing pollutants from the medium.

10. The method of claim 9, wherein the medium is selected from the group consisting of wastewater, an oil medium, or a gaseous medium.

11. The method of claim 9, wherein the adsorbing pollutants from the wastewater occurs at atmospheric pressure, and wherein the adsorbing pollutants from the wastewater is via a diffusion rate of 0.001-1.0 cm$^2$s$^{-1}$.

12. The method of claim 9, wherein the adsorbing pollutants from the wastewater occurs at zero voltage.

13. The method of claim 9, wherein the adsorbing pollutants from the wastewater is via ion exchange.

14. The method of claim 9, wherein the pollutant is an organic pollutant or an inorganic pollutant; wherein the organic pollutant is selected from the group consisting of phenol, benzene, xylene, toluene, and ethylbenzene; and wherein the inorganic pollutant is selected from the group consisting of sulfide, sulfate, $H_2SO_4$, HCl, and $HNO_3$.

15. The method of claim 14, wherein the organic pollutant is toluene.

16. The method of claim 14, wherein the pollutant comprises toluene and ethylbenzene, and the method removes at least 70% of the toluene and 40% of the ethylbenzene from the medium.

17. The method of claim 9, comprising monitoring the medium with light irradiation sources to test the absorption of the pollutant.

18. A method for desalinating water comprising
    treating saline with the composite membrane of claim 1; and
    adsorbing saline pollutants from the saline.

19. The method of claim 18, wherein the adsorbing saline pollutants from the saline occurs at room temperature.

20. The method of claim 18, wherein the adsorbing saline pollutants from the saline occurs at atmospheric pressure.

21. The method of claim 19, wherein the adsorbing saline pollutants from the saline occurs at 0.8-1.5 V.

22. The method of claim 21, wherein the adsorbing saline pollutants from the saline is via capacitive deionization at 0.8-1.5 V.

23. The method of claim 18, wherein the saline pollutants are selected from the group consisting of sodium chloride, carbonate, and phosphate.

24. The method of claim 23, wherein the saline pollutants is sodium chloride.

25. The method of claim 24, wherein the saline pollutants are characterized by salinity level of 500-35000 ppm sodium chloride.

* * * * *